(12) United States Patent
Kim et al.

(10) Patent No.: US 9,533,365 B2
(45) Date of Patent: Jan. 3, 2017

(54) ELECTRIC DISCHARGE MACHINING APPARATUS

(71) Applicants: Ieyoung Kim, Tokyo (JP); Takashi Hashimoto, Tokyo (JP); Tomoaki Takada, Tokyo (JP); Takayuki Nakagawa, Tokyo (JP); Yuto Sasaki, Tokyo (JP)

(72) Inventors: Ieyoung Kim, Tokyo (JP); Takashi Hashimoto, Tokyo (JP); Tomoaki Takada, Tokyo (JP); Takayuki Nakagawa, Tokyo (JP); Yuto Sasaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/437,072

(22) PCT Filed: Oct. 31, 2012

(86) PCT No.: PCT/JP2012/078163
§ 371 (c)(1),
(2) Date: Apr. 20, 2015

(87) PCT Pub. No.: WO2014/068701
PCT Pub. Date: May 8, 2014

(65) Prior Publication Data
US 2015/0283634 A1     Oct. 8, 2015

(51) Int. Cl.
*B23H 1/02*        (2006.01)
(52) U.S. Cl.
CPC ............... *B23H 1/024* (2013.01); *B23H 1/02* (2013.01); *B23H 2300/20* (2013.01)

(58) Field of Classification Search
CPC ........... B23H 1/024; B23H 1/022; B23H 1/02; B23H 7/14; B23H 7/20; B23H 2300/20; B23H 1/026; G05B 2219/45221
(Continued)

(56) References Cited

U.S. PATENT DOCUMENTS 4,431,895 A    2/1984   Obara
4,450,337 A    5/1984   Inoue
(Continued)

FOREIGN PATENT DOCUMENTS

JP    51-13497 A      2/1976
JP    56-146623 A     11/1981
(Continued)

OTHER PUBLICATIONS

Japanese Office Action for JP 2013-513482 dated Jun. 25, 2013.
International Search Report for PCT/JP2012/078163 dated Jan. 22, 2013.

*Primary Examiner* — Dana Ross
*Assistant Examiner* — James Sims, III
(74) *Attorney, Agent, or Firm* — Sughrue Mion, PLLC; Richard C. Turner

(57) ABSTRACT

An electric discharge machining apparatus includes a power supply, an electrode gap formed from an electrode and a workpiece, a current limiting resistor connected between the power supply and the electrode gap, switching elements that turns on and off application of a voltage from the power supply to the electrode gap, an inductance element connected in series between the switching elements and the electrode gap, and a control unit that controls the switching elements. The control unit causes the switching elements to perform ON/OFF operations according to a switching pattern having an on-pulse time width (ΔTon) in which a voltage of the electrode gap can reach a voltage value of the power supply in an on-pulse time and a pause time width (Continued)

(ΔToff) equal to or longer than a time width (Δtic) of a discharge current flowing during the capacitor discharge and shorter than a cycle (ΔTso) of the self-excited oscillation.

7 Claims, 6 Drawing Sheets

(58) Field of Classification Search
USPC .......................... 219/69.13, 69.18; 700/162
See application file for complete search history.

(56) References Cited

U.S. PATENT DOCUMENTS

| | | |
|---|---|---|
| 5,111,017 A | 5/1992 | Futamura et al. |
| 5,216,218 A | 6/1993 | Sasaki |
| 5,756,956 A | 5/1998 | Sato et al. |
| 6,130,395 A | 10/2000 | Kaneko et al. |
| 2008/0173617 A1* | 7/2008 | Murai ................. B23H 11/006 219/69.13 |
| 2010/0308017 A1* | 12/2010 | Hashimoto ............ B23H 1/022 219/69.13 |

FOREIGN PATENT DOCUMENTS

| | | |
|---|---|---|
| JP | 57-156128 A | 9/1982 |
| JP | 3-79221 A | 4/1991 |
| JP | 4-87722 A | 3/1992 |
| JP | 4-315521 A | 11/1992 |
| JP | 5-38627 A | 2/1993 |
| JP | 6-143034 A | 5/1994 |
| JP | 8-90342 A | 4/1996 |
| JP | 11-207526 A | 8/1999 |
| JP | 2000-52151 A | 2/2000 |
| JP | 2003-205426 A | 7/2003 |
| JP | 2011-183515 A | 9/2011 |
| JP | 2012-166323 A | 9/2012 |

* cited by examiner

ELECTRIC DISCHARGE MACHINING APPARATUS

CROSS REFERENCE TO RELATED APPLICATIONS

This application is a National Stage of International Application No. PCT/JP2012/078163 filed Oct. 31, 2012, the contents of which are incorporated herein by reference in their entirety.

FIELD

The present invention relates to an electric discharge machining apparatus.

BACKGROUND

An electric discharge machining apparatus is an apparatus that performs machining of a workpiece by generating arc discharge between a machining electrode and the workpiece. In the electric discharge machining apparatus, a power source (a machining power supply) for generating the arc discharge is necessary. Concerning the configuration of the machining power supply, there have been various configurations.

Among the configurations, there is known a capacitor discharge system that makes use of electrode-gap capacitor capacitance present in parallel to an electrode gap. A basic configuration is configured by a power supply, a current limiting resistor, and electrode-gap capacitor capacitance. When a capacitor element is connected to the electrode gap in parallel, the electrode-gap capacitor capacitance is capacitance obtained by combining mechanical stray capacitance between an electrode and a workpiece and the capacitance of the capacitor element. When the capacitor element is not connected to the electrode gap in parallel, the electrode-gap capacitor capacitance is mechanical stray capacitance between the electrode and the workpiece.

In the basic circuit, first, when the electrode-gap capacitor capacitance is charged from the power supply via the power supply limiting resistor, an electrode-gap voltage rises. When the electrode-gap voltage exceeds a discharge start voltage, dielectric breakdown occurs. Electric charges accumulated in the electrode-gap capacitor capacitance are used as discharge energy. The electrode-gap voltage drops to arc potential according to electric discharge. An electric current flows by the discharge energy stored in the electrode-gap capacitor capacitance. In this case, because an electric current from the power supply is limited by a current limiting resistance value, a ratio of the electric current from the power supply is extremely small in the electric current flowing to the electrode gap at the start of electric discharge. Therefore, when the electric charges stored in the electrode-gap capacitor capacitance are exhausted, it is difficult to continue the electric discharge any more. Thereafter, when the electric discharge ends and insulation recovery occurs, an electric current flows to the electrode-gap capacitor capacitance again from the power supply via a charging resistor, and the electrode-gap voltage rises.

A phenomenon in which ON (electric discharge) and OFF (non-electric discharge or open) are repeated according to the behavior of the electric discharge itself is called self-excited oscillation. In the self-excited oscillation, a discharge current is specified by the electrode-gap capacitor capacitance. However, by inserting a switching element between the power supply and the electrode gap, the discharge current can also be specified by switching.

Patent Literature 1 mentions that, in an electric discharge machining power supply circuit, a variable resistor and a switching element, and a current suppression resistor having a resistance value sufficiently larger than a resistance value of the variable resistor are connected in parallel between a direct-current voltage source and a machining electrode, the switching element is turned on when machining is stably in progress, and the switching element is turned off when the machining becomes unstable. Consequently, according to Patent Literature 1, when the machining becomes unstable, supply energy between the machining electrode and a workpiece is reduced to suppress occurrence of an electric discharge phenomenon. Therefore, it is possible to reduce electric discharge in a side surface direction and secondary electric discharge that occurs via machining powder. It is possible to attain stabilization of electric discharge machining and improvement of machining speed.

Patent Literature 2 mentions that, in a wire electric discharge machining apparatus, a direct-current power supply and an electrode gap, in which a workpiece and a machining electrode are arranged to be opposed to each other, are full bridge-connected by four switching elements and a group pulse pattern is supplied to the switching elements in one diagonal arm among the four switching elements to switch the switching elements. In this case, when detecting electric discharge on the basis of a signal from an electrode-gap state detection circuit, a control unit sets a pulse pause time after electric discharge detection longer than a pulse pause time during non-electric discharge. When further detecting a state in which electric discharge tends to continue and lead to disconnection of a wire, the control unit sets a pulse pause time longer than the pulse pause time after the electric discharge detection. Consequently, according to Patent Literature 2, a pause time of a group pulse is controlled according to an electric discharge state during electric discharge. Therefore, it is possible to prevent concentration of the electric discharge and attain stabilization of machining and improvement of machining speed.

On the other hand, it is also possible to adjust ON and OFF of self-excited oscillation by inserting an inductance element and a capacitor element in a power supply circuit other than a resistor.

Patent Literature 3 mentions that, in a wire cut electric discharge machining apparatus, a variable resistor is provided in a wiring before a contact of an electromagnetic switch and an inductance element is provided in a wiring extended from the contact of the electromagnetic switch to a workpiece. Consequently, according to Patent Literature 3, a circuit that supplies very small electric discharge energy to a machining gap is configured by the variable resistor and the inductance element. The inductance element also plays a role for cancelling a stray capacitor component in the wire.

CITATION LIST

Patent Literature

Patent Literature 1: Japanese Patent Application Laid-Open No. H5-38627
Patent Literature 2: Japanese Patent Application Laid-Open No. 2012-166323

Patent Literature 3: Japanese Patent Application Laid-Open No. 2000-52151

SUMMARY

Technical Problem

First, characteristics of capacitor discharge are explained.

The capacitor discharge is often used in an area of finishing or all processes of machining performed using a thin (a thin line area smaller than ϕ0.1) wire. Electric discharge energy is determined by a power supply voltage, a current limiting resistance, and electrode-gap capacitor capacitance. In a super finishing machining area, it is required to reduce the electrode-gap capacitor capacitance. When capacitor capacitance decreases, if a resistor having the same resistance value is used, a rise of a voltage quickens and discharge current width is reduced by a decrease in a charge amount. Therefore, the frequency of self-excited oscillation due to natural electric discharge without use of switching increases.

The capacitor discharge is completed by electrode-gap capacitor capacitance (or only electrode-gap stray capacitance). However, in general, the capacitor discharge is generated by a CR circuit in which a resistor is inserted. It is also conceivable to use dielectric power of inductance by inserting an inductance element into this circuit to configure an LCR circuit. There is an advantage that a rise of the LCR circuit quickens. On the other hand, a voltage tends to overshoot and, when a short circuit occurs, a large electric current is likely to flow. Therefore, it is difficult to select a constant. A circuit constant that satisfies all variously-changing electrode-gap states does not exist. Therefore, variation of a waveform occurs according to a machining state.

On the other hand, in oscillation control performed using a switching element, there is a limit in a frequency for ON and OFF according to the performance of an element. During electric discharge, when capacitor capacitance present in parallel to an electrode gap is large, one discharge current is quickly cut by performing oscillation and forcibly inserting a pause time. This is effective because it is possible to restrict electric discharge energy and quickly raise a voltage. However, when the electrode-gap capacitor capacitance decreases and the self-excited oscillation becomes quicker than a threshold frequency of an oscillation control element, if oscillation control is performed using a group pulse, it is likely that a discharge frequency is not sufficiently obtained and a machining ability decreases.

When the characteristics of the electric discharge phenomenon are taken into account, in the technologies described in Patent Literatures 1 to 3, problems explained below are likely to occur.

The technology described in Patent Literature 1 proposes a method of, when machining becomes unstable during capacitor discharge, performing switching to connect large resistors in series and limiting an electric current flowing to the electrode gap. First, Patent Literature 1 does not disclose a method of detecting the fact that the machining has become unstable. The technology described in Patent Literature 1 is considered to be a technology for, when machining is unstable, to stop the self-excited oscillation of the capacitor discharge when a drive shaft is moved to space apart the electrode and the workpiece, inserting a large resistor to suppress electrode-gap electric discharge. In the technology described in Patent Literature 1, unstableness of machining is controlled by the resolution of drive shaft servo. However, whereas a discharge frequency occurs in the order of several hundred kilohertz to several megahertz, the order of the resolution of servo for moving the drive shaft is several ten kilohertz. Therefore, the unstableness of the machining is considered to be controlled with considerably slower responsiveness than the discharge frequency. On the other hand, in the CR circuit, a gradient at an instance when an electric current flows and a capacitor is charged is larger than a gradient of the LCR circuit. Therefore, there is a problem in that continuous electric discharge tends to occur. Because of the reasons explained above, when the technology of Patent Literature 1 is used, in machining performed using the capacitor discharge, it is highly likely that machining surface accuracy is deteriorated by the continuous electric discharge and fluctuation in the machining increases because of the control with slower responsiveness. Therefore, it is considered difficult to increase machining accuracy and machining efficiency.

The technology described in Patent Literature 2 is considered to be a technology for applying group pulse control to capacitor discharge to adjust a duty ratio of a group pulse. In this technology, it is assumed that electric discharge is caused once during ON width of the group pulse. Depending on a time constant determined by resistance and capacitor capacitance, it is likely that oscillation control suppresses self-excited oscillation. Machining can be stabilized by increasing a pause time. However, it is difficult to improve machining accuracy. In Patent Literature 2, control is performed in a circuit that causes pulses several times and rises to a predetermined voltage. The control is effective when a rise of a voltage is slower than ON and OFF of a switching element. Therefore, when the capacitor capacitance decreases and the rise of the voltage becomes quicker than the ON and OFF of the switching element, if the control by the Patent Literature 2 is used, a pause time is inserted after the voltage rises. Therefore, it is likely that an assumed effect cannot be obtained. On the other hand, because a discharge frequency decreases by the insertion of the pause time, it is likely that a machining ability decreases. Consequently, in the technology described in Patent Literature 2, the pause time is more frequently inserted as the time constant of the circuit by a value of the capacitor capacitance increases. Therefore, it is difficult to improve machining efficiency.

The technology described in Patent Literature 3 proposes a technology for, to input very small energy during finishing, inserting an inductance element to reduce stray capacitance present between an electrode and a workpiece. In the configuration described in Patent Literature 3, it is difficult to perform control according to an electric discharge state. Therefore, it is likely that machining surface accuracy is deteriorated by fluctuation and unevenness of electric discharge. On the other hand, it is likely that surface roughness is deteriorated because overshoot occurs during a rise of a voltage because of the inductance element and electric discharge is performed at a voltage higher than a predetermined voltage. When the electrode and the workpiece are short-circuited during electric discharge, it is likely that surface roughness is deteriorated because an electric current continues to flow to the inductance element and a large voltage occurs in an electrode gap at an instance of an open circuit. In the technology described in Patent Literature 3, it is likely that fluctuation in surface roughness increases according to a circuit configuration. Control for suppressing the fluctuation in surface roughness is difficult. Therefore, it is difficult to improve machining accuracy and efficiency.

The present invention has been devised in view of the above and it is an object of the present invention to obtain an electric discharge machining apparatus that can improve machining accuracy and machining efficiency in machining performed using capacitor discharge.

Solution to Problem

In order to solve the aforementioned problems, an electric discharge machining apparatus that performs electric discharge machining according to one aspect of the present invention includes: a power supply; an electrode gap formed from an electrode and a workpiece; a current limiting resistor connected between the power supply and the electrode gap; switching elements that turn on and off application of a voltage from the power supply to the electrode gap; an inductance element connected in series between the switching element and the electrode gap; and a control unit that controls the switching element, wherein the electric discharge machining apparatus causes capacitor discharge, which makes use of capacitor capacitance of the electrode gap, to oscillate in a self-excited manner and performs machining, and the control unit causes the switching elements to perform ON and OFF operations according to a switching pattern having an on-pulse time width in which a voltage of the electrode gap can reach a voltage value of the power supply in an on-pulse time and a pause time width equal to or longer than a time width of a discharge current flowing during the capacitor discharge and shorter than a cycle of the self-excited oscillation.

Advantageous Effects of Invention

According to the present invention, in the capacitor discharge, although the self-excited oscillation is prioritized, the pause time is provided intermittently, that is, periodically at a cycle at which the machining is considered to be unstable. Therefore, it is possible to prevent a long-term short circuit from occurring and suppress a situation in which a voltage rises suddenly to be higher than the voltage of the power supply when the short circuit is eliminated and a large electric current flows to the electrode gap. Consequently, it is possible to suppress a decrease in a discharge frequency and eliminate an unstable condition of the electrode gap. Therefore, it is possible to improve machining accuracy and machining efficiency in machining performed using capacitor discharge.

DESCRIPTION OF EMBODIMENTS

Embodiments of an electric discharge machining apparatus according to the present invention are explained in detail below with reference to the drawings. Note that the present invention is not limited by the embodiments.

First Embodiment

Figure 1:
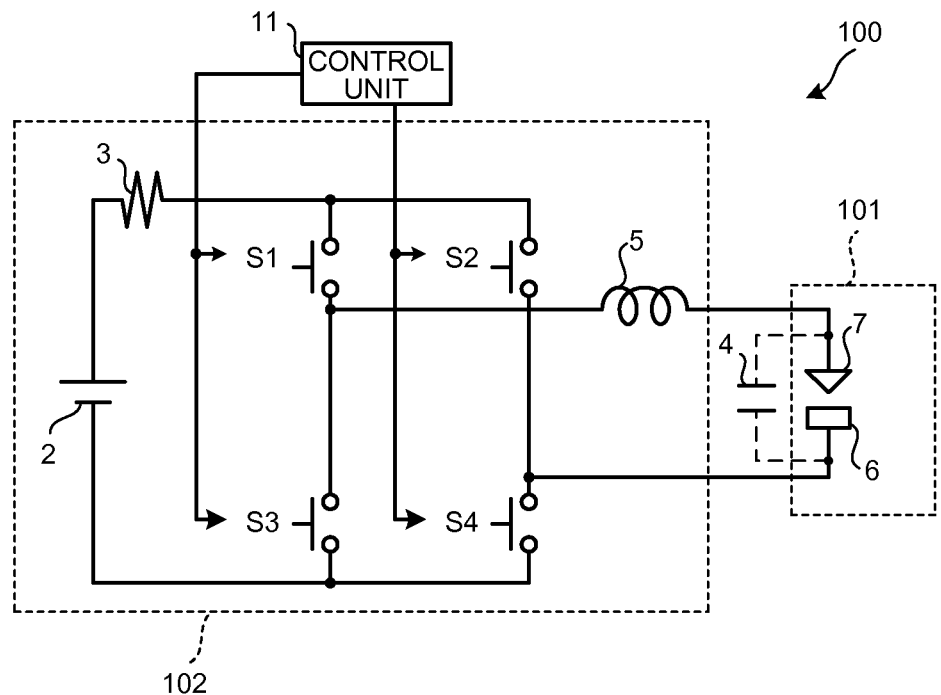
FIG. 1 is a diagram of a configuration example of an electric discharge machining apparatus according to a first embodiment.
Figure 2:
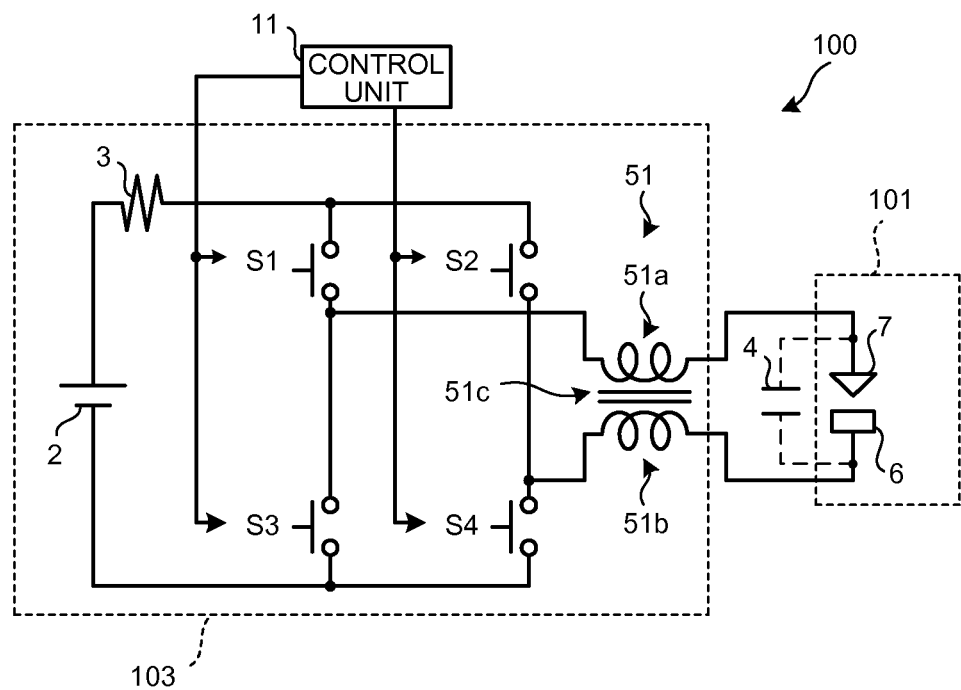
FIG. 2 is a diagram of another configuration example of the electric discharge machining apparatus according to the first embodiment.

An electric discharge machining apparatus 100 according to a first embodiment is explained with reference to FIGS. 1 and 2. FIG. 1 is a diagram of a configuration example of the electric discharge machining apparatus 100. FIG. 2 is a diagram of another configuration example of the electric discharge machining apparatus 100.

For example, as shown in FIG. 1, the electric discharge machining apparatus 100 includes an electrode gap 101, a power supply unit 102, and a control unit 11.

The electrode gap 101 is formed from an electrode 7 and a workpiece 6. The electrode 7 and the workpiece 6 are opposed to each other via a machining gap. The workpiece 6 is, for example, earthed to ground potential. Capacitor capacitance 4 present between the electrode 7 and the workpiece 6 can be arbitrarily inserted. Alternatively, stray capacitance present in a machine component such as a cable can also be used.

The capacitor capacitance 4 included in the electrode gap 101 is set, for example, in parallel to the electrode 7 and the workpiece 6. When the electrode 7 and the workpiece 6 are apart from each other, a voltage is applied to the capacitor capacitance 4 and electric charges are accumulated. When the electrode 7 and the workpiece 6 approach and electric discharge occurs, energy due to the electric charges accumulated in the capacitor capacitance 4 flows between the electrode 7 and the workpiece 6. A capacitor element is sometimes inserted into the capacitor capacitance 4 according to a use. The capacitor capacitance 4 is sometimes present in a cable or a machining tank. The capacitor capacitance 4 is sometimes configured by only a stray capacitance component determined by the shape and the size of the electrode 7 and the workpiece 6 and the distance between the electrode 7 and the workpiece 6.

The power supply unit 102 includes a power supply 2, a resistor 3, a plurality of switching elements S1 to S4, and an inductance element 5. The power supply 2 is, for example, a direct-current power supply and generates direct-current electric power. The power supply 2 is connected to the electrode gap 101 via the switching elements S1 to S4. For example, the power supply 2 is a power supply device that applies a machining voltage matching a predetermining machining condition (e.g., rough machining or finishing) to the electrode gap 101 and causes electric discharge necessary for predetermined machining in the electrode gap 101.

Note that the power supply 2 can be an alternating-current power supply. When the power supply 2 is the alternating-current power supply, a rectifier circuit can be provided between the power supply 2 and the switching elements S1 to S4 by, for example, bridge-connecting a plurality of diodes.

The switching elements S1 to S4 are electrically connected between the power supply 2 and the electrode gap 101 and turns on and off application of a voltage from the power supply 2 to the electrode gap 101. For example, the switching elements S1 to S4 are full-bridge connected to configure a full-bridge circuit. The switching elements S1 and S4 and the switching elements S2 and S3 are respectively switching elements that configure diagonal arms. By alternately turning on and off one diagonal arm (the switching elements S1 and S4) and the other diagonal arm (the switching elements S2 and S3), it is possible to turn on and off the application of the voltage from the power supply 2 to the electrode gap 101 and change the polarity of a voltage applied between the electrode 7 and the workpiece 6. In bipolar machining for performing machining while changing polarity, it is necessary to configure a full bridge using the switching elements S1 to S4. However, when machining is performed at only one polarity, it is also possible to perform ON and OFF control by one switching element rather than the full-bridge configuration.

The resistor 3 is inserted to limit an electric current such that a large electric current does not flow from the power supply 2. Other than the use for current limitation, the resistor 3 is also a parameter for determining a time constant of a rise of a voltage. Therefore, it is also possible to change the rise of the voltage by adjusting a value of the resistor 3. The resistor 3 only has to be inserted into a path. Therefore, the resistor 3 can be inserted between the power supply 2 and the switching element S1 as shown in FIG. 1. For example, the resistor 3 can be inserted between the switching element S1 and the inductance element 5, can be inserted between the power supply 2 and the switching element S3, or can be inserted between the switching element S4 and the workpiece 6. However, when the switching elements are turned on, the resistor 3 needs to be inserted into a path extending from the power supply 2 to the electrode 7 or a path extending from the workpiece 6 to the power supply 2.

The inductance element 5 plays a role of quickening a rise of a voltage applied between the electrode 7 and the workpiece 6 according to a change in an electric current flowing during charging of the capacitor capacitance 4 and during machining. A circuit of an LCR circuit is configured between the resistor 3 and the capacitor capacitance 4 by the insertion of the inductance element 5. By setting the inductance element 5 to a value satisfying a critical condition of the LCR circuit, it is possible to quicken the rise of the voltage without causing overshoot. The inductance element 5 can be inserted between the switching elements S1 to S4 and the electrode 7 as shown in FIG. 1 or can be inserted between the switching elements S1 to S4 and the workpiece 6. The inductance element 5 is, for example, a coil.

Alternatively, for example, as shown in FIG. 2, the electric discharge machining apparatus 100 can include a power supply unit 103 instead of the power supply unit 102 (see FIG. 1).

The power supply unit 103 includes an inductance element 51 instead of the inductance element 5 (see FIG. 1). For the inductance element 51, for example, a component obtained by winding a first winding wire 51a and a second winding wire 51b around a core 51c is used. By introducing the inductance element 51, it is possible to suppress the influence of a low-frequency current and suppress an electric current flowing to stray capacitance (the capacitor capacitance 4) present in a machine. The inductance element 51 is generally called choke coil. The inductance element 51 is an element in which the first winding wire 51a and the second winding wire 51b are wound around the core 51c to make use of generation of a passage (a magnetic path) of a magnetic flux inside of the core 51c. The first winding wire 51a and the second winding wire 51b are wound in opposite directions each other around the core 51c. Therefore, the inductance element 51 does not affect as inductance on electric currents flowing in opposite directions in the first winding wire 51a and the second winding wire 51b. The inductance element 51 acts as large inductance when the current flowing in one of the first winding wire 51a and the second winding wire 51b and the current flowing in the other of the first winding wire 51a and the second winding wire 51b are in the same direction. Therefore, it is possible to limit an electric current flowing to the circuit. That is, the function of the inductance element 5 (FIG. 1) in the inductance element 51 is equivalent to a stray inductance component in which the influence as inductance of the inductance element 51 is small.

In many uses of the capacitor discharge, a small electric current is used to perform micro machining. When machining under stricter conditions is demanded from the market, it is necessary to reduce energy as much as possible. Stray capacitance remains because there is a limit in reducing capacitance present in the machining tank, the cable, and the like on the machine side rather than between the electrode 7 and the workpiece 6. In the capacitor capacitance 4, when the capacitance of the capacitor element is large, a ratio of the stray capacitance present on the machine side is small. Therefore, influence on machining can be neglected. However, when the capacitor capacitance 4 is small, that is, when the capacitance of the capacitor element is reduced to perform micro machining, the ratio of the stray capacitance present on the machine side increases. Therefore, energy charged in the stray capacitance flows between the electrode 7 and the workpiece 6 during electric discharge. It is likely that surface roughness of a machined surface increases to be larger than surface roughness of a machined surface assumed from the magnitude of the capacitance of the capacitor element.

When the inductance element 51 in FIG. 2 is a choke coil and a magnetic flux generated inside the core 51c is used, it is possible to suppress an electric current charged in the stray capacitance on the machine side. As a result, it is possible to prevent the influence from the stray capacitance on the machine side even if a value of the capacitor capacitance 4 is small.

As the inductance element 51, a structure such as a choke coil can also be used. However, the inductance element 51 can also be substituted by an equivalent circuit having the effect explained above (e.g., a circuit obtained by winding the first winding wire 51a and the second winding wire 51b in opposite directions each other around a bar-like iron core). By varying at least one of the material of the core 51c and the number of turns of a winding wire between the first winding wire 51a and the second winding wire 51b, it is possible to control a magnetic flux generated inside the core 51c and use the magnetic flux as inductance in electric currents flowing in opposite directions.

As working fluid for electric discharge machining, for example, two kinds of liquid, i.e., water and oil, are mainly used. The difference in a physical property due to the type of the working fluid variously affects electric discharge. In the electric discharge machining apparatus 100 shown in FIG. 1, the capacitor capacitance 4 is greatly affected by the working fluid. In particular, when machining is performed by only mechanically present stray capacitance, because the dielectric constant of the working fluid determines the magnitude of the capacitor capacitance 4, it is necessary to configure a circuit to be capable of absorbing a change in the capacitor capacitance 4 due to the working fluid.

The control unit 11 controls the switching elements S1 to S4. That is, the control unit 11 supplies oscillation signals to control terminals of the switching elements S1 to S4 to cause the switching elements S1 to S4 to perform ON/OFF operations. Details of the control (oscillation control) by the control unit 11 are explained below.

Figure 3:
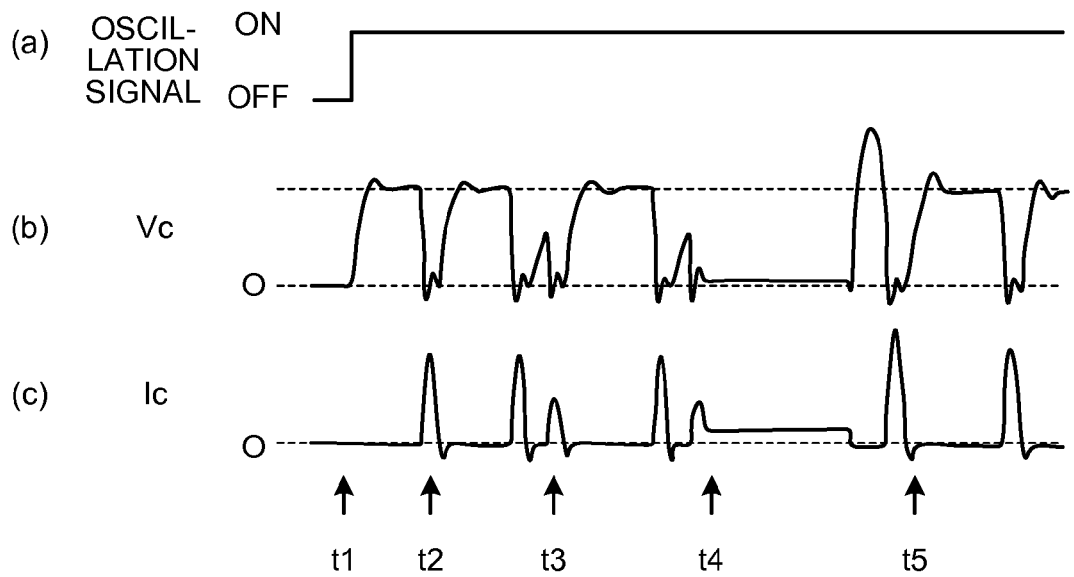
FIG. 3 is a diagram of an oscillation signal, an electrode-gap voltage, and a current waveform generated when switching control is not performed in capacitor discharge.

An electric discharge operation regarding the case in which the oscillation control is not performed in the electric discharge machining apparatus 100 shown in FIG. 1 or 2 is explained with reference to FIG. 3. FIG. 3 represents signal, voltage, and current waveforms generated when the oscillation control is not performed. (a) in FIG. 3 represents ON and OFF signals of the switching elements, for example S1 and S4, (b) represents transition of an electrode-gap voltage, and (c) represents a discharge current waveform. Regarding the switching elements S1 and S4 in (a), it is assumed that ON/OFF control of the switching elements S1 and S4 are performed during fixed polarity. In FIG. 3, the electrode 7 is set to plus (the switching elements S1 and S4 are turned on). Note that, in this case, the remaining switching elements S2 and S3 are maintained in the OFF state.

When electric discharge occurs as shown in FIGS. 3(*b*) and 3(*c*), energy accumulated in the capacitor capacitance 4 flows as an electric current. A voltage is applied at the rising time determined by a time constant of the LCR circuit. Operations at timings t1 to t5 in FIG. 3 are explained with reference to FIG. 1.

At the timing t1, the control unit 11 turns on the switching elements S1 and S4. Consequently, the voltage of the power supply 2 is charged in the capacitor capacitance 4 of the electrode gap 101 through the switching element S1 and the inductance element 5 (or the inductance element 51), and a voltage Vc is applied between the electrode 7 and the workpiece 6. In the capacitor discharge, as at the timing t1, the voltage Vc is applied to the electrode gap 101 at a time constant determined by constants of the resistor 3, the inductance element 5, and the capacitor capacitance 4. In this case, because electric discharge does not occur, a discharge current Ic does not flow.

Note that, in FIG. 3, because the oscillation control is not performed, after the timing t1, an oscillation signal is fixed at an ON level until an oscillation stop command is given. That is, the control unit 11 continuously supplies the oscillation signal at the ON level to the control terminals of the switching elements S1 and S4.

The timing t2 indicates waveforms of the voltage Vc and the discharge current Ic of the electrode gap 101 generated when electric discharge occurs. When the electric discharge occurs, a charge amount (energy) charged in the capacitor capacitance 4 flows between the electrode 7 and the workpiece 6, and a loop linked to the power supply 2 through the switching element S4 is formed. When electric charges charged in the capacitor capacitance 4 finish flowing to the electrode gap 101 and insulation is recovered between the electrode 7 and the workpiece 6, as at the timing t1, the voltage Vc is applied again.

The timing t3 indicates occurrence of electric discharge before the capacitor capacitance 4 is completely charged by an applied voltage. The amount of electric charges flowing to the electrode gap 101 is an amount of electric charges charged in the capacitor capacitance 4. Therefore, compared with the timing t2, a small electric current flows. In the case of continuous electric discharge, electric discharge often occurs before a voltage completely rises. Therefore, a small discharge current Ic shown near the timing t3 continues.

The timing t4 represents waveforms of the voltage Vc and the discharge current Ic of the electrode gap 101 generated when a short circuit occurs. When the electrode 7 and the workpiece 6 are short-circuited after electric discharge, the electrode gap 101 is linked by an arc column, and an arc voltage is applied and a short-circuit current flows. A short-circuit time is several microseconds to several milliseconds. When the electric current flows for such a long time, the electric current continues to flow to the electrode gap 101, and energy continues to be stored in the inductance element 5 (or the inductance element 51). When the short circuit is eliminated, the energy stored in the inductance element 5 (or the inductance element 51) during the short circuit suddenly flows to the electrode gap 101. Therefore, the voltage Vc of the electrode gap 101 greatly rises suddenly.

The timing t5 indicates that, if an electric discharge occurs when a voltage greatly rises suddenly, a large electric current flows to the electrode gap 101.

As explained above, in the capacitor discharge by the LCR circuit, when the oscillation control is not performed, there is no means capable of controlling fluctuation in an electric discharge state. When a short circuit occurs, overshoot of a short-circuit current and a voltage cannot be limited. Therefore, it is likely that problems occur, for example, unevenness occurs on a machined surface, streaks due to the short circuit occur, and a discharge frequency decrease.

Therefore, in the first embodiment, in the capacitor discharge by the LCR circuit, a pause period for maintaining the switching elements in the OFF state is periodically inserted to solve the problems.

Figure 4:
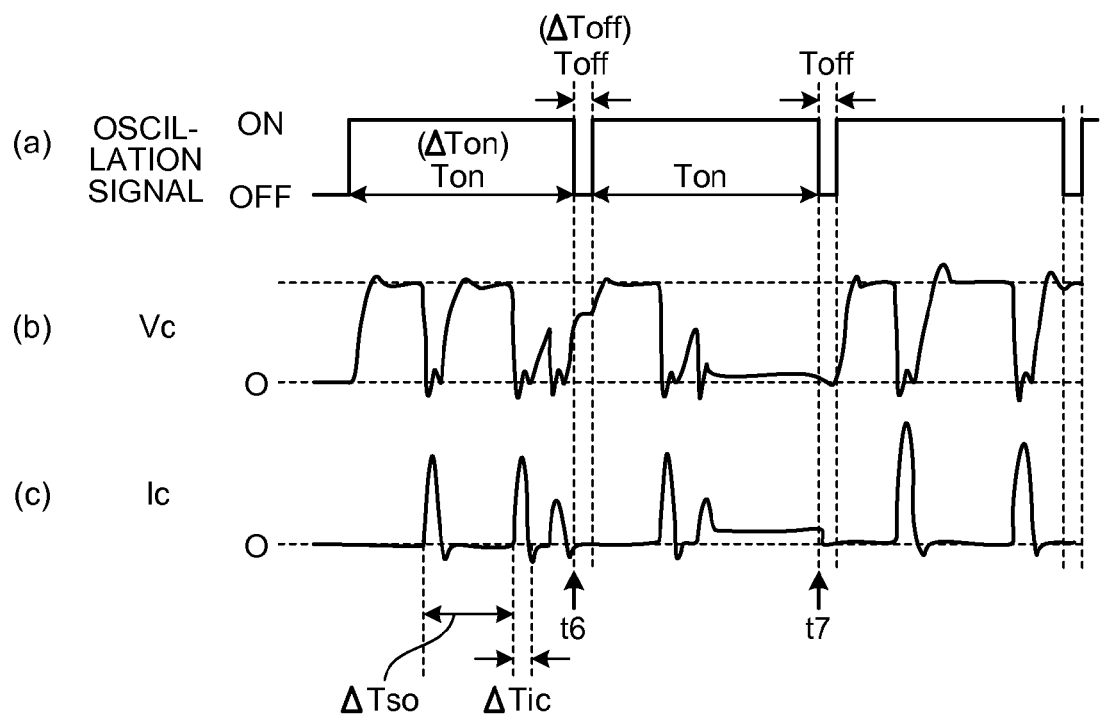
FIG. 4 is a diagram of an oscillation signal, an electrode-gap voltage, and a current waveform indicating oscillation control in the first embodiment.

Specifically, as shown in FIG. 4(*a*), the control unit 11 causes the switching elements S1 and S4 to perform ON and OFF operations according to a switching pattern (an oscillation signal) having an on-pulse time width $\Delta$Ton in which the voltage Vc of the electrode gap 101 can reach a voltage value of the power supply 2 in an on-pulse time Ton and a pause time width $\Delta$Toff equal to or longer than a time width $\Delta$Tic of the discharge current Ic flowing during the capacitor discharge and shorter than a cycle $\Delta$Tso of self-excited oscillation. The on-pulse time width $\Delta$Ton is, for example, experimentally obtained in advance assuming that the voltage Vc of the electrode gap 101 can reach the voltage value of the power supply 2 in the on-pulse time Ton. The pause time width $\Delta$Toff is, for example, experimentally obtained in advance assuming that the pause time width $\Delta$Toff is equal to or longer than the time width $\Delta$Tic of the discharge current Ic flowing during the capacitor discharge and equal to or shorter than the cycle $\Delta$Tso of the self-excited oscillation.

In the first embodiment, as shown in FIG. 4(*a*), the oscillation control for intermittently inserting a pause time Toff is performed to solve the problems of the capacitor discharge explained above.

As in FIG. 3, it is explained what kind of change occurs according to the oscillation control when electric discharge and a short circuit occur. While the switching elements S1 and S4 are turned on and a voltage is applied to the electrode gap 101 from the power supply 2, operations same as the operations performed when the oscillation control is not performed shown in FIG. 3 are performed.

When the pause time Toff for turning off the switching elements S1 and S4 is inserted, the application of the voltage from the power supply 2 to the electrode gap 101 is stopped.

For example, as at timing t6, when the pause time Toff is inserted while the voltage Vc of the electrode gap 101 is rising (see FIG. 4(b), the rise of the voltage is delayed by the pause time width ΔToff. However, because the pause time width ΔToff is sufficiently short with respect to the cycle ΔTso of the self-excited discharge, the influence of a discharge frequency drop is little.

On the other hand, as at timing t7, when a short circuit occurs, by inserting the pause time Toff, it is possible to reduce the time in which a short-circuit current flows (see FIG. 4(c)). After the elapse of the pause time Toff, the rise of the voltage is equivalent to a normal voltage rise. Therefore, it is possible to greatly reduce overshoot of a voltage due to inductance (see the waveform of the voltage Vc immediately before the timing t5 shown in FIG. 3).

The control unit 11 turns on the switching elements S1 and S4 and controls voltage application duration, in which the voltage from the power supply 2 is applied to the electrode gap 101, that is, the pulse-on time width ΔTon to be longer than a rising time constant of the voltage Vc of the electrode gap 101 and to have the time in which self-excited oscillation not by the oscillation control occurs twice or more. The control unit 11 controls the on-pulse time width ΔTon not to adversely affect a machined surface even when a short circuit occurs immediately after the voltage Vc of the electrode gap 101 rises. The voltage application duration (the on-pulse time ΔTon) needs to be adjusted (e.g., optimized) to a proper range according to a circuit constant. For example, the voltage application duration (the on-pulse time ΔTon) can be set in the order of several microseconds to several hundred microseconds.

On the other hand, the pause time Toff is preferably equal to or longer than discharge current duration during electric discharge (the time width ΔTi of the discharge current Ic). If the pause time Toff is set shorter than the discharge current duration during the electric discharge (the time width ΔTic of the discharge current Ic), it is likely that the electric discharge continues and cannot be stopped even if the pause time Toff is inserted. The pause time Toff needs to be set to a length for consuming energy of the inductance element 5 (or the inductance element 51) during the pause time Toff such that the energy stored in the inductance element 5 (or the inductance element 51) does not flow to the electrode gap 101 when a short circuit is eliminated.

The pause time width ΔToff is preferably a length shorter than the cycle ΔTso of the self-excited oscillation. If the pause time width ΔToff is equal to or longer than the cycle ΔTso of the self-excited oscillation, the discharge frequency decreases, so that a machining ability tends to fall. Like the voltage application duration, the setting of the pause time width ΔToff needs to be adjusted (e.g., optimized) to a proper range according to the circuit constant. For example, the pause time width ΔToff can be set to be equal to or shorter than several ten microseconds.

Two methods are conceivable as a method of inserting the pause time Toff. The first method is a method of turning off the switching elements S1 and S4 and stopping the voltage application from the power supply 2 to the electrode 7 and the workpiece 6. When the voltage application from the power supply 2 is stopped, the voltage applied to the electrode gap 101 drops during the pause time Toff, and it is made possible to prevent electric discharge from continuously occurring. The second method is a method of forming a closed loop not including the power supply 2 to consume the voltage applied to the electrode gap 101. For example, when the switching elements S1 and S4 are on, the switching elements S3 and S4 are turned on during the pause time Toff to form a closed circuit not including the power supply 2, and it is made possible to suppress electric discharge from continuously occurring during the pause time Toff. In particular, the second method is considered to be effective in electric discharge machining in which a voltage drop due to a leak current is small. Conversely, in the first method, the voltage continues to be applied to the electrode gap 101 even if the switching elements S1 and S4 are turned off and the electrode gap 101 is electrically separated from the power supply 2. Therefore, there is an advantage that the discharge frequency can be set higher than the discharge frequency in the second method.

According to such control, when a gap distance of the electrode gap 101 is long and the discharge frequency is not dense, a frequency due to the self-excited oscillation is secured and the pause time Toff is periodically inserted at a cycle at which machining is considered to be stable. Consequently, it is made possible to suppress a short circuit of the electrode gap 101 and consume energy stored in the inductance element 5 (or the inductance element 51).

As explained above, in the first embodiment, in the electric discharge machining apparatus 100, the control unit 11 causes the switching elements S1 and S4 to perform the ON and OFF operations according to the switching pattern having the on-pulse time width ΔTon in which the voltage Vc of the electrode gap 101 can reach the voltage value of the power supply 2 in the on-pulse time Ton and the pause time width ΔToff equal to or longer than the time width ΔTic of the discharge current Ic flowing during the capacitor discharge and shorter than the cycle ΔTso of the self-excited oscillation. That is, in the capacitor discharge, although the self-excited oscillation is prioritized, the pause time Toff is provided intermittently, that is, periodically at a cycle (ΔTon+ΔToff) at which the machining is considered to be unstable. Therefore, it is made possible to prevent a long-term short circuit from occurring and suppress the situation in which a voltage rises suddenly to be higher than the voltage of the power supply 2 during elimination of the short circuit (the overshoot during the voltage application shown immediately before the timing t5 in FIG. 3) and a large electric current flows to the electrode gap 101. In other words, control for avoiding a machining unstableness element of the capacitor discharge is intermittently (periodically) inserted. Consequently, it is made possible to suppress occurrence of streaks on a machined surface due to concentrated electric discharge and a short circuit, a decrease in a discharge frequency, and a decrease in a machining ability. Consequently, it is made possible to suppress a decrease in the discharge frequency and eliminate, in an early stage, a state in which the electrode gap 101 is unstable. Therefore, it is made possible to improve machining accuracy and machining efficiency in machining performed using the capacitor discharge.

For example, in all processes of thin line (smaller than φ0.1) machining of wire electric discharge machining performed by capacitor discharge and in a finishing (or super finishing) area in which surface roughness has to be reduced, it is possible to improve machining accuracy and machining efficiency.

In the first embodiment, in the electric discharge machining apparatus 100, the inductance element 5 (or the inductance element 51) is connected in series between the switching elements S1 to S4 and the electrode gap 101. Consequently, in the capacitor discharge, because high frequency discharge can be generated, it is made possible to improve machining efficiency (machining ability). By sufficiently making use of the self-excited oscillation of the capacitor discharge circuit, it can be expected that the machining ability can be further improved than the control that makes use of the group pulse by the switching elements.

In the first embodiment, in the electric discharge machining apparatus 100, the control unit 11 controls one of the on-pulse time width ΔTon and the pause time width ΔToff in the switching pattern such that the voltage of the electrode gap 101 does not exceed the voltage value of the power supply 2 because of the energy of the inductance element 5 (or the inductance element 51). For example, the control unit 11 controls the on-pulse time width ΔTon to periodically insert the pause time Toff at the cycle (ΔTon+ΔToff) during which the machining is considered to be unstable. Consequently, it is possible to suppress a short circuit of the electrode gap 101 and consume energy stored in the inductance element 5 (or the inductance element 51). As a result, it is possible to control the voltage of the electrode gap 101 so as not to exceed the voltage value of the power supply 2 because of the energy of the inductance element 5 (or the inductance element 51).

Second Embodiment

Figure 5:
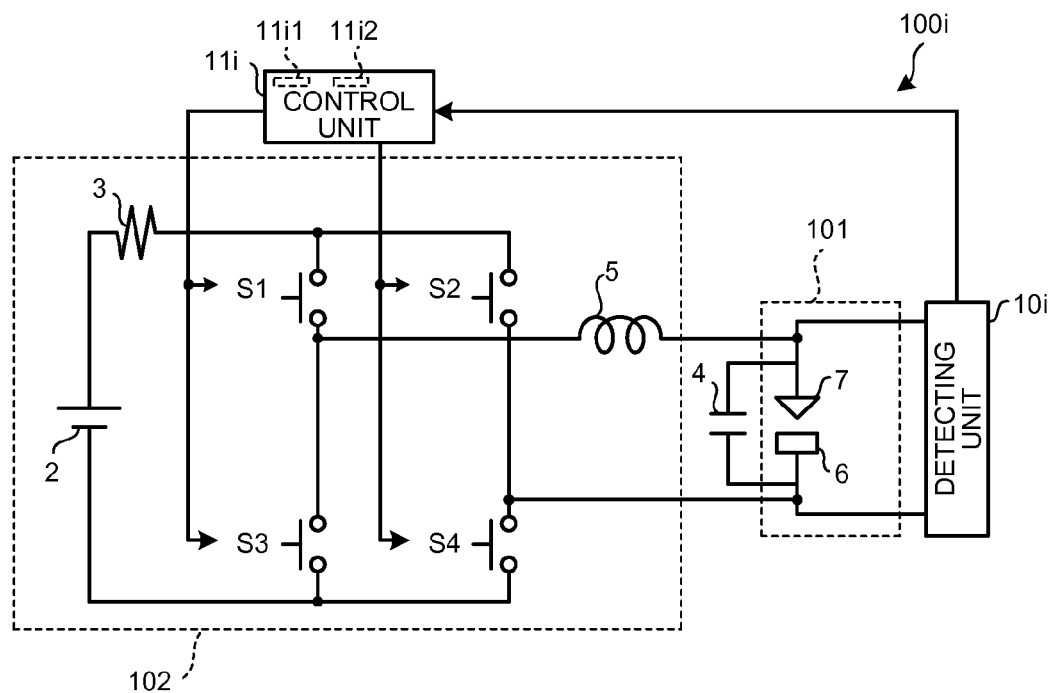
FIG. 5 is a diagram of a configuration of an electric discharge machining apparatus according to a second embodiment.
Figure 6:
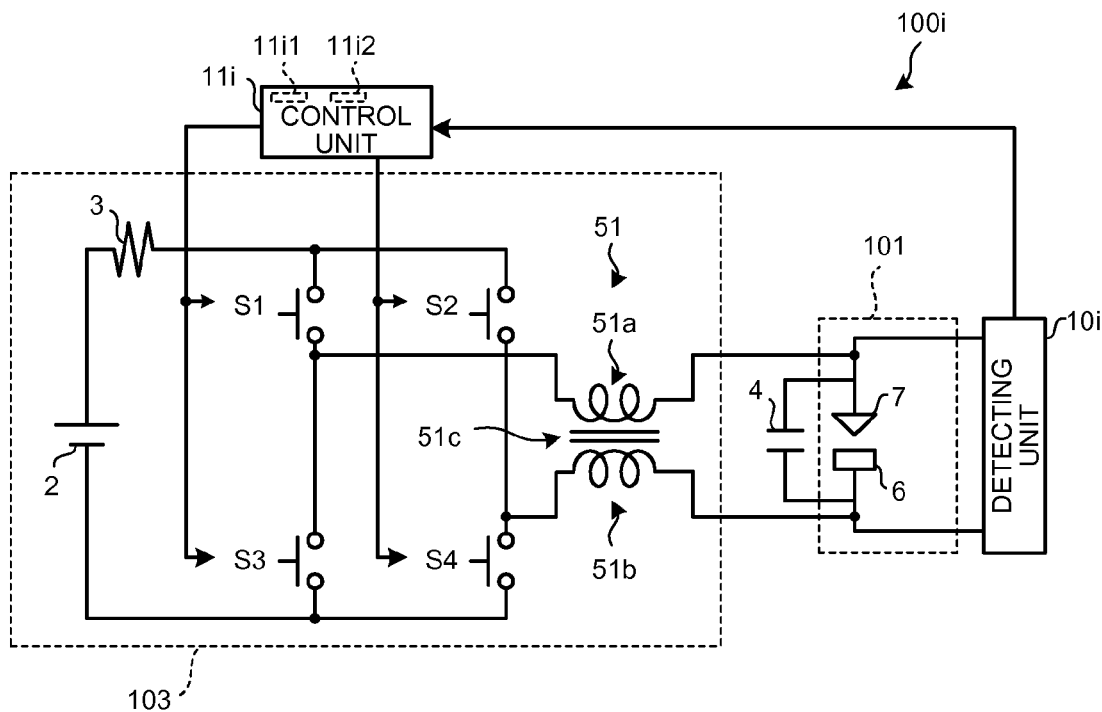
FIG. 6 is a diagram of another configuration example of the electric discharge machining apparatus according to the second embodiment.

An electric discharge machining apparatus 100i according to a second embodiment is explained with reference to FIGS. 5 and 6. FIG. 5 is a diagram of a configuration example of the electric discharge machining apparatus 100i. FIG. 6 is a diagram showing another configuration example of the electric discharge machining apparatus 100i. In the following explanation, differences from the first embodiment are mainly explained.

In the first embodiment, for the on-pulse time width ΔTon and the pause time width ΔToff in the switching pattern (the oscillation signal), for example, the on-pulse time width ΔTon and the pause time width ΔToff experimentally obtained in advance are used. On the other hand, in the second embodiment, the on-pulse time width ΔTon and the pause time width ΔToff in the switching pattern (the oscillation signal) are dynamically adjusted according to a state of the electrode gap 101.

For example, as shown in FIG. 5, compared with the electric discharge machining apparatus 100 shown in FIG. 1, the electric discharge machining apparatus 100i further includes a detecting unit 10i and includes a control unit 11i instead of the control unit 11. Alternatively, for example, as shown in FIG. 6, compared with the electric discharge machining apparatus 100 shown in FIG. 2, the electric discharge machining apparatus 100i further includes a detecting unit 10i and includes the control unit 11i instead of the control unit 11.

Specifically, the detecting unit 10i detects a state of the electrode gap 101 in self-oscillation during an ON operation. The detecting unit 10i is provided in parallel to the electrode gap 101 formed from the electrode 7 and the workpiece 6. The detecting unit 10i supplies a detection result to the control unit 11i. The control unit 11i outputs ON and OFF signals for the respective switching elements S1 to S4 according to a predetermined control rule and controls a voltage applied to the electrode gap 101 including the electrode 7 and the workpiece 6. That is, the control unit 11i determines a state of the electrode gap 101 according to a detection result by the detecting unit 10i and controls, according to a result of the determination, at least one of the on-pulse time width ΔTon and the pause time width ΔToff in the switching pattern (the oscillation signal).

The detecting unit 10i can be provided between the electrode 7 and the workpiece 6 as shown in FIGS. 5 and 6 or can be provided on the output side of a circuit, that is, between the switching elements S1 to S4 and the inductance element 5 (the inductance element 51). If the detecting unit 10i is provided in parallel to the electrode gap 101, there is an advantage that it is possible to directly observe an electric discharge state of the electrode gap 101. If the detecting unit 10i is an output destination of the circuit, a circuit configuration can be integrated and a wiring from the electrode gap 101 to the control unit 11i can be reduced (e.g., eliminated). Therefore, it is possible to reduce unnecessary stray capacitance.

The detecting unit 10i can detect, for example, parameters representing a machining state such as a voltage and an electric current of the electrode gap 101 and output data of the parameters to the control unit 11i. The control unit 11i can determine a state of the electrode gap 101 using the input data and data processed using differential, integral, or a tool such as a counter and determine control (switching pattern) of the switching elements S1 to S4 corresponding to the state of the electrode gap 101.

States of the electrode gap 101 treated by the detecting unit 10i and the control unit 11i are explained.

The principle of the electric discharge machining is summarized. A voltage is applied between the electrode 7 and the workpiece 6, dielectric breakage is caused when electric field intensity increases, and electric discharge machining is performed by electric charges accumulated in the capacitor capacitance 4. When the electric discharge ends, insulation is recovered between the electrode 7 and the workpiece 6, electric charges are charged in the capacitor capacitance 4 by a voltage applied from the power supply 2, and an electric field is formed between the electrode 7 and the workpiece 6 again.

As a parameter representing such a discharge phenomenon, there is data of a voltage and an electric current of the electrode gap 101. It is possible to determine presence or absence of electric discharge occurrence at a detected timing from a voltage waveform. It is possible to estimate an electric current (energy) flowing during the electric discharge from a voltage value applied at an instance when electric discharge is performed. It is also possible to find input energy by averaging voltages in a fixed time. It is also possible to estimate fluctuation in the electric discharge by calculating time differential of the voltages. A current waveform appears as a result of the electric discharge phenomenon. First, it is made possible to determine presence or absence of electric discharge occurrence. It is made possible to estimate input energy by calculating an amount of electric charges from the current waveform. It is also made possible to calculate a frequency of electric discharge occurrence and calculate fluctuation by counting discharge current pulses generated in a fixed time.

For example, the control unit 11i includes a calculating unit 11i1 and a determining unit 11i2. The calculating unit 11i1 calculates energy during electric discharge according to a state of the electrode gap 101 (e.g., a voltage, an electric current, and the number of discharge pulses of the electrode gap 101) detected by the detecting unit 10*i*. The calculating unit 11*i*1 supplies the calculated energy during electric discharge to the determining unit 11*i*2. The determining unit 11*i*2 determines, according to the calculated energy during electric discharge, the on-pulse time width ΔTon and the pause time width ΔToff in a switching pattern. For example, the determining unit 11*i*2 determines the on-pulse time width ΔTon and the pause time width ΔToff in the switching pattern such that energy input to the electrode gap 101 reaches an energy target value E0.

A processing device for the data of the voltage and the electric current can be provided on the circuit to analogically process the data or can perform digital processing after A/D conversion. The processing only has to be selected as appropriate according to responsiveness required by a machining use and an ability of an element.

Figure 7:
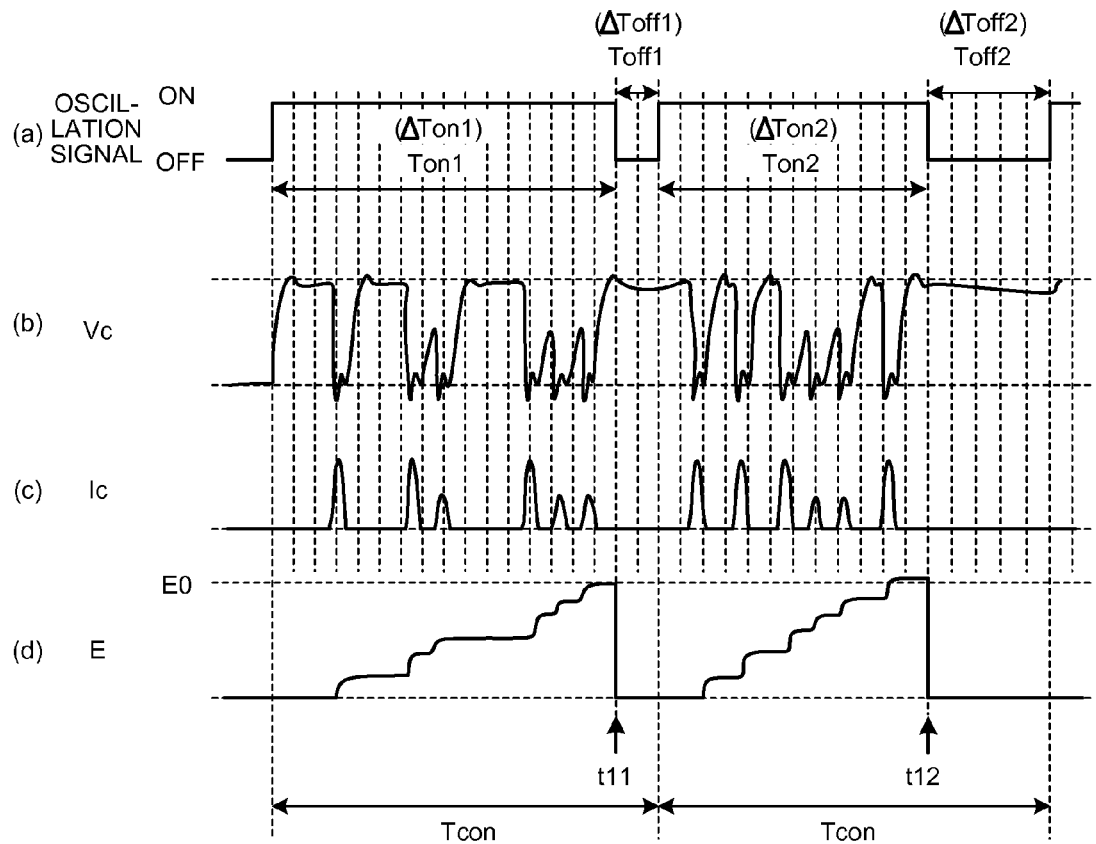
FIG. 7 is a diagram of an oscillation signal, an electrode-gap voltage waveform, a current waveform, and transition of an energy integral value in a fixed time indicating oscillation control in the second embodiment.

FIG. 7 is a diagram of an example of a switching signal waveform and an electrode-gap voltage waveform for explaining an electric discharge control operation in the second embodiment. In FIG. 7, (*a*) to (*c*) are contents corresponding to (*a*) to (*c*) in FIGS. 3 and 4. (*d*) in FIG. 7 represents a state of integral of energy in a fixed time. The energy shown in FIG. 7(*d*) is a value calculated by the control unit 11*i* (e.g., the calculating unit 11*i*1) from the parameters detected by the detecting unit 10*i*.

The second embodiment proposes a control method for detecting a state of the electrode gap 101 and determining, to eliminate fluctuation in machining energy, timing (i.e., the on-pulse time ΔTon) for turning off the switching elements S1 and S4 (inserting the pause time Toff) and an OFF time (i.e., the pause time width ΔToff). That is, the control method is a control method for adjusting, for each electric discharge state, for example, an ON time (the pulse-on time Ton) and an OFF time (the pause time Toff) of the switching elements until insertion of a fixed pause time to keep input energy to the electrode gap 101 fixed and performing stable machining.

In FIG. 7, a vertical dotted line represents timing of detection (a cycle Tcon). Energy input in a fixed time is calculated from data captured during the detection. The input energy can be calculated by processing the detection parameters for the electric discharge state such as an average voltage value, a count value of a discharge pulse, and an integral value of a charge amount. Data is captured at every detection timing. When a calculation value of the input energy reaches a predetermined target value E0, pause times Toff1 and Toff2 are set and inserted at the next timing.

Control of the voltage application duration (the pulse-on time Ton) and the pause time Toff is explained with reference to FIG. 7. First, the switching elements (S1 and S4 or S2 and S3) are turned on to apply a voltage to the electrode gap 101 including the electrode 7 and the workpiece 6. Thereafter, free electric discharge (self-excited oscillation) determined by an LCR circuit constant occurs. Input energy is calculated at every detection timing after a voltage is applied to the electrode gap 101. The pause time Toff is input at a timing t11 when the calculation value of the input energy becomes larger than the target value E0 set in advance. A voltage is applied to the electrode gap 101 again after the elapse of the pause time Toff1. The pause time Toff2 is input again at a timing t12 when the input energy becomes larger than the predetermined target value E0.

In the present embodiment, it is possible to suppress occurrence of concentrated electric discharge and fluctuation in electric discharge by, for example, calculating energy input in the fixed time Tcon and keeping the input energy fixed (e.g., a value near the target value E0). When the pause time Toff1 is inserted at the timing t11, a pause time width ΔToff1 inserted after long voltage application duration time (an on-pulse time width ΔTon1) becomes relatively short. When pause is inserted at the timing t12, a pause time width ΔToff2 inserted after short voltage application duration (an on-pulse time width ΔTon2<ΔTon1) is set relatively long (ΔToff2>ΔToff1). In an electric discharge state shown in FIG. 7, the voltage application duration Ton1 is longer than Ton2 until the input energy reaches the predetermined E0 in Tcon. Therefore, the pause time Toff1 is set shorter than Toff2.

In such control, if the input energy does not reach the predetermined energy level E0 in the fixed time Tcon, the energy calculated at a point in time Tcon is reset and the energy in the next Tcon is calculated. Therefore, when machining is rather open and a discharge frequency is low, it is possible to improve machining efficiency by keeping the switching elements on without providing the pause time Toff.

In the second embodiment, an idea of the voltage application durations (the on-pulse times Ton1 and Ton2) and the pause times Toff1 and Toff2 is basically the same as the idea in the first embodiment. For example, the voltage application durations (the on-pulse times Ton1 and Ton2) are set to be longer than a rising time constant of a voltage, to have time in which self-excited oscillation not by oscillation control occurs twice or more, and not to adversely affect a machined surface even when a short circuit occurs immediately after the voltage rises. On the other hand, the pause times Toff1 and Toff2 are set to time longer than the time width ΔTic of the discharge current Ic and longer than the time in which energy stored in inductance is consumed during the time for short circuit elimination but to be shorter than the cycle ΔTso of the self-excited oscillation not to reduce a discharge frequency. In the second embodiment, it is possible to cope with short circuit occurrence in addition to equalization of input energy by setting, taking into account the voltage application durations and the pause times as explained above, the time Tcon for calculating energy.

According to the control in the second embodiment, by adjusting the input energy in the capacitor discharge, it is possible to prevent unevenness from occurring on a machined surface and prevent streaks due to a short circuit from occurring.

As explained above, in the second embodiment, in the electric discharge machining apparatus 100*i*, the detecting unit 10*i* detects a state of the electrode gap 101 in the self-excited oscillation during the ON operation. The control unit 11*i* controls, on the basis of the state of the electrode gap 101 detected by the detecting unit 10*i*, the on-pulse time widths ΔTon1 and ΔTon2 in the switching pattern. Consequently, it is made possible to set the on-pulse time width ΔTon1 and ΔTon2 short or long according to an electric discharge state during the last ON operation, for example, according the energy input to the electrode gap 101 reaching the target value E0. Consequently, it is possible to maintain the energy input to the electrode gap 101 at every cycle Tcon of the control fixed. It is possible to reduce fluctuation and unevenness of electric discharge that occur in machining. Therefore, it is possible to further improve the machining accuracy and the machining efficiency.

In the second embodiment, in the control unit 11*i*, the calculating unit 11*i*1 calculates energy during electric discharge according to the state of the electrode gap 101 detected by the detecting unit 10*i*. The determining unit 11*i*2 determines, according to the energy during electric discharge calculated by the calculating unit 11*i*1, for example, according to the energy input to the electrode gap 101 reaching the target value E0, the on-pulse time widths ΔTon1 and ΔTon2 and the pause time widths ΔToff1 and ΔToff2 in the switching pattern. Consequently, it is made possible to maintain energy input to the electrode gap 101 at every cycle Tcon of the control near the target value E0.

Third Embodiment

Figure 8:
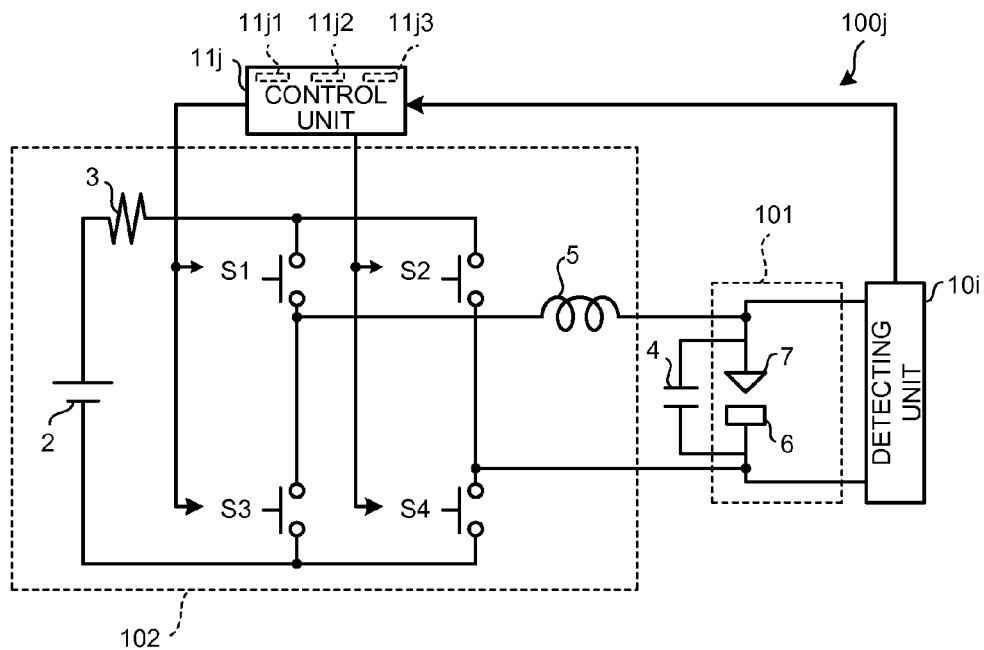
FIG. 8 is a diagram of a configuration example of an electric discharge machining apparatus according to a third embodiment.
Figure 9:
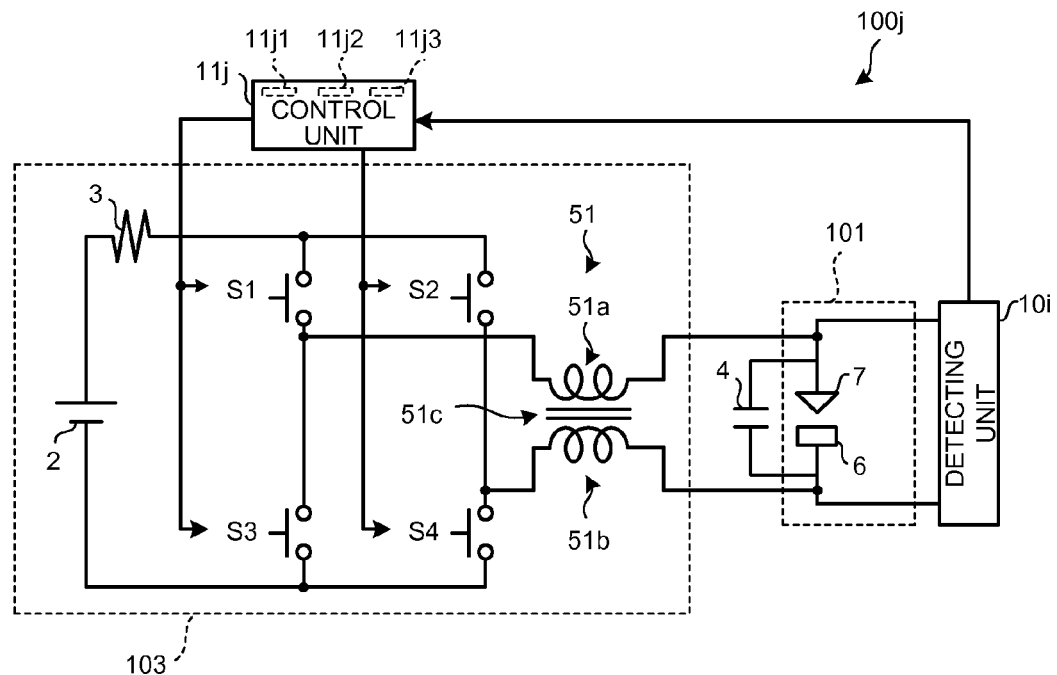
FIG. 9 is a diagram of another configuration example of the electric discharge machining apparatus according to the third embodiment.

An electric discharge machining apparatus 100*j* according to a third embodiment is explained with reference to FIGS. 8 and 9. FIG. 8 is a diagram of a configuration example of the electric discharge machining apparatus 100*j*. FIG. 9 is a diagram of another configuration example of the electric discharge machining apparatus 100*j*. In the following explanation, differences from the second embodiment are mainly explained.

In the second embodiment, the on-pulse time width and the pause time width in the switching pattern are adjusted according to the state of the electrode gap 101 detected by the detecting unit 10*i* such that the input energy to the electrode gap 101 is substantially fixed. On the other hand, in the third embodiment, the on-pulse time width and the pause time width in the switching pattern are adjusted according to the state of the electrode gap 101 detected by the detecting unit 10*i* such that a short circuit of the electrode gap 101 is eliminated.

Specifically, the electric discharge machining apparatus 100*j* shown in FIGS. 8 and 9 includes a control unit 11*j* instead of the control unit 11*i* (FIGS. 5 and 6). The control unit 11*j* includes a discriminating unit 11*j*1, a calculating unit 11*j*2, and a counting unit 11*j*3.

Figure 10:
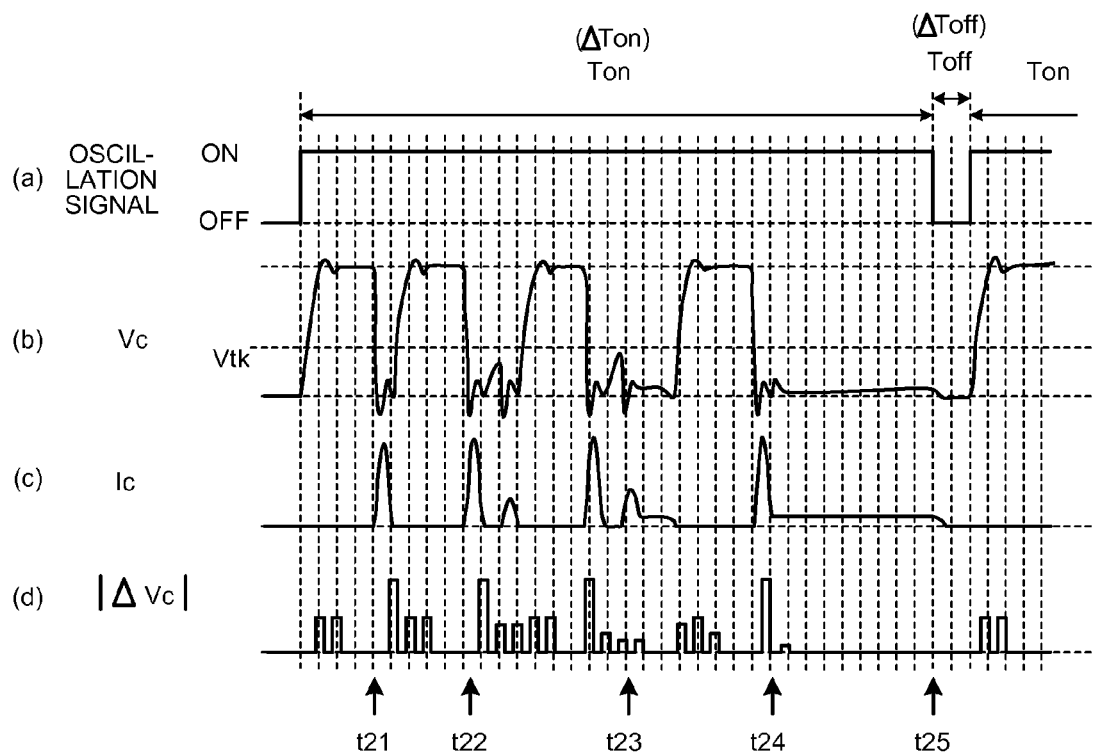
FIG. 10 is a diagram of an oscillation signal, an electrode-gap voltage waveform, a current waveform, and transition of a time differential value of a voltage indicating oscillation control in the third embodiment.

FIG. 10 is a diagram of an example of a switching signal waveform and an electrode-gap voltage waveform for explaining an electric discharge control operation in the third embodiment. (*a*) in FIG. 10 represents ON and OFF signals of switching elements, (*b*) represents transition of an electrode-gap voltage, (*c*) represents a discharge current waveform, and (*d*) represents a change due to time of the electrode-gap voltage, that is, a time differential value of a voltage. In oscillation signals (a switching pattern) of (*a*) in FIG. 10, it is assumed that the switching elements S1 to S4 are maintained at fixed polarity. When the electrode 7 is set to plus, the switching elements S1 and S4 are turned on. When the electrode 7 is set to minus, the switching elements S2 and S3 are turned on.

In the third embodiment, a method for short circuit detection and oscillation control in capacitor discharge machining is proposed. As explained above, when the electrode 7 and the workpiece 6 are short-circuited during the capacitor discharge machining, a machining ability falls and surface roughness is deteriorated. However, in the capacitor discharge machining, electric discharge does not always occur at a fixed voltage. Fluctuation is large in a voltage immediately before electric discharge according to an inter-electrode distance, and fluctuation is also large in a peak value of a discharge current. Therefore, it is difficult to set thresholds for results of detection of a voltage and an electric current and, when a voltage and an electric current of the electrode gap 101 are lower than the thresholds, uniformly discriminate that a short circuit has occurred.

Therefore, in the third embodiment, to more accurately detect a short circuit, the discriminating unit 11*j*1 has, for the voltage of the electrode gap 101, a threshold Vtk for discriminating a short circuit. The calculating unit 11*j*2 calculates a time differential value |ΔVc| of the voltage of the electrode gap 101. The counting unit 11*j*3 for counting two parameters is also provided in the control unit 11*j*. The time differential value |ΔVc| of the voltage can be calculated by analogical processing before A/D conversion or can be calculated by digital processing after the A/D conversion. The counting unit 11*j*3, which counts the voltage Vc and the differential value |αc| of the voltage to compare the voltage Vc and the differential value |Δ of the voltage with thresholds, can analogically count according to processing using a filter or can digitally calculate.

Figure 11:
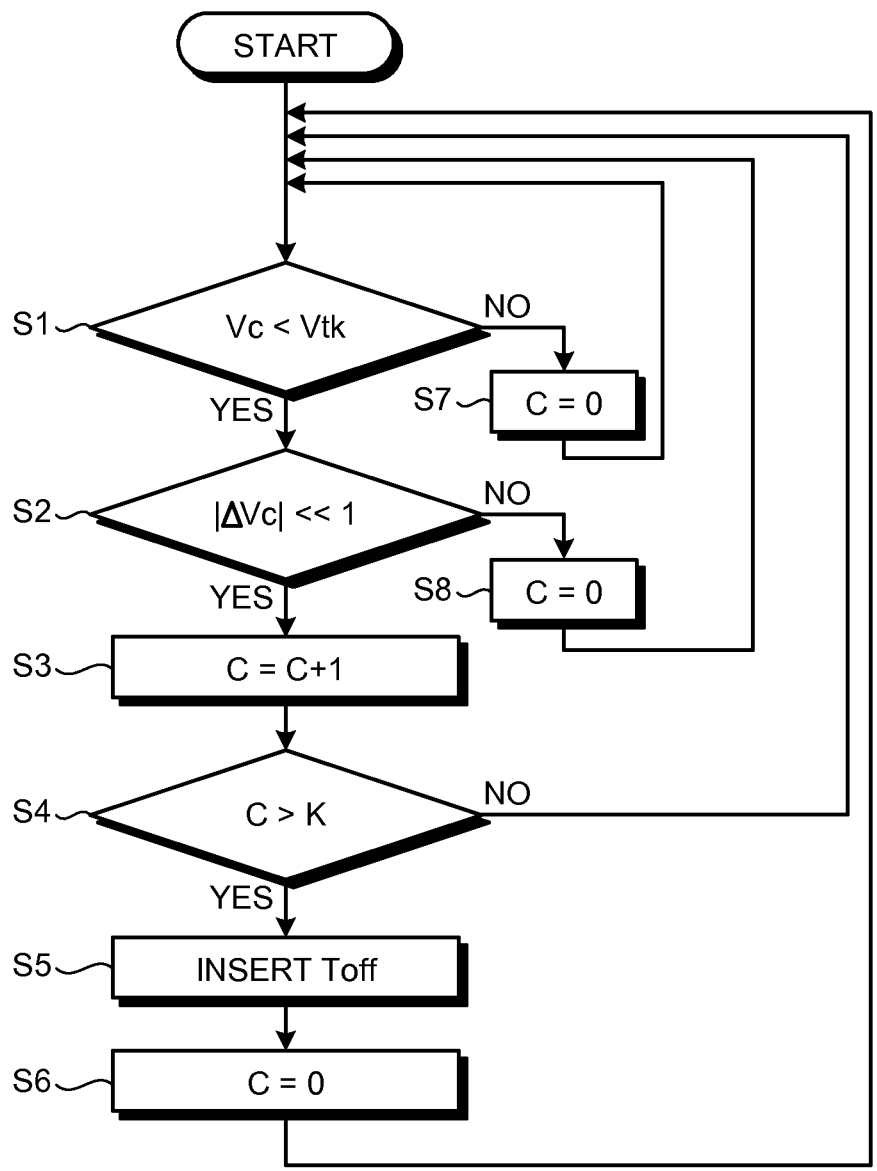
FIG. 11 is a flowchart of the oscillation control in the third embodiment.

FIG. 11 is a flowchart for explaining a flow of control for discriminating a short circuit and inputting a pause time. In FIG. 11, Vc represents a voltage value of the electrode gap 101 detected by the detecting unit 10*i*. Vtk represents a threshold of a voltage set as a short circuit detection level by the discriminating unit 11*j*1. |ΔVc| represents a time differential value of the voltage Vc. C is a count value by the counting unit 11*j*3. K represents a maximum of the count C with which the discriminating unit 11*j*1 can determine that a short circuit occurs.

A process for determining that a short circuit has occurred is explained with reference to FIGS. 10 and 11. In FIG. 10, until timing t21 after a power supply is turned on, the voltage Vc is higher than the short circuit detection level Vtk (No at step S1). Therefore, the control unit 11*j* does not determine that a short circuit has occurred. The control unit 11*j* sets 0 in the count value C (step S7).

At timing t22 in FIG. 10, the voltage Vc is lower than the short circuit detection level Vtk (Yes at step S1). Therefore, the control unit 11*j* proceeds to step S2. However, electric discharge has occurred and the voltage differential value |ΔVc| is not sufficiently smaller than 1 (No at step S2). Therefore, the control unit 11*j* does not discriminate that a short circuit has occurred. The control unit 11*j* sets 0 in the count value C (step S8).

At timing t23 in FIG. 10, a short-term short circuit occurs. In this case, the voltage Vc is lower than the short circuit detection level Vtk (Yes at step S1). Therefore, the control unit 11*j* proceeds to step S2. At a point in time when a short circuit has occurred, the voltage differential value |ΔVc| is su|ΔVc| sufficiently smaller than 1 (Yes at step S2). Therefore, the control unit 11*j* proceeds to step S3. The control unit 11*j* counts up (increments) the count value C and compares the count value C with the maximum K (step S4). However, at the timing t23 in FIG. 10, the short circuit is naturally eliminated and insulation is immediately recovered. Therefore, the short circuit is eliminated before the count value C reaches the maximum K (No at step S4) (No at steps S1 and S2). Therefore, the count value C is reset to 0 (steps S7 and S8).

At timing t24 in FIG. 120, a short circuit actually occurs for a long period and is less easily naturally eliminated. At the timing t24 in FIG. 10, the count value C exceeds the maximum K at every detection timing (Yes at step S4). Therefore, the control unit 11*j* inserts the pause time Toff (step S5). The state in that case is a state at timing t25 in FIG. 10. As a method of inserting the pause time, an appropriate method is selected according to working fluid and a machining use from two methods, i.e., a method of turning off the switching elements and electrically separating the electrode gap 101 from the power supply 2 and a method of forming a closed circuit not including the power supply 2, as in the first and second embodiments. The control unit 11*j* resets the count value C to 0 (step S6).

In the third embodiment, an idea of the pause time Toff is basically the same as the idea in the first embodiment. For example, the pause time width ΔToff is set to time longer than the time width ΔTic of the discharge current, and longer than the time in which energy stored in inductance is consumed during a short circuit elimination but to be shorter than the cycle ΔTso of the self-excited oscillation so as not to reduce a discharge frequency. The short circuit is eliminated by inserting a necessary minimum pause time in this way.

According to such control, by detecting a short circuit and inserting the pause time in the capacitor discharge, it is made possible to prevent streaks due to the short circuit from occurring on a machined surface and a machining efficiency from falling because of the short circuit.

As explained above, in the third embodiment, in the electric discharge machining apparatus 100j, when it is determined on the basis of the state of the electrode gap 101 detected by the detecting unit 10i that a short circuit has occurred in the electrode gap 101, the control unit 11j inserts the pause time Toff into the switching pattern to thereby control the on-pulse time width ΔTon in the switching pattern. Consequently, when the length of a period until machining becomes unstable fluctuates, the self-excited oscillation can be performed until the machining becomes unstable. Therefore, it is possible to further improve the discharge frequency and further improve the machining efficiency. When the machining becomes unstable, the pause time Toff is inserted. Therefore, it is possible to suppress streaks from occurring on a machined surface because of concentrated electric discharge and a short circuit.

INDUSTRIAL APPLICABILITY

As explained above, the electric discharge machining apparatus according to the present invention is useful for electric discharge machining.

REFERENCE SIGNS LIST

2 Power supply
3 Resistor
4 Capacitor capacitance
5 Inductance element
51 Inductance element
6 Workpiece
7 Electrode
10i Detecting unit
11, 11i, 11j Control units
100, 100i, 100j Electric discharge machining apparatuses
101 Electrode gap
102, 103 Power supply units
S1 to S4 Switching elements

The invention claimed is:

1. An electric discharge machining apparatus that performs electric discharge machining, the electric discharge machining apparatus comprising:
a power supply;
an electrode gap formed between an electrode and a workpiece;
a current limiting resistor connected between the power supply and the electrode gap;
a plurality of switching elements that turn on and off application of a voltage from the power supply to the electrode gap;
an inductance element connected in series between the plurality of switching elements and the electrode gap; and
a controller that controls the plurality of switching elements, wherein
the electric discharge machining apparatus causes capacitor discharge, which makes use of capacitor capacitance of the electrode gap, to oscillate in a self-excited manner according to a circuit constant of an LCR circuit configured with the current limiting resistor, the inductance element, and the capacitor capacitance,
the controller transmits an oscillation control signal to at least one of the plurality of switching elements, and
the oscillation control signal includes an on-pulse time period, during which a voltage of the electrode gap reaches a voltage value of the power supply and the self-excited oscillation occurs two or more times, and a pause time period, which is longer than or equal to a time period during which current is discharged from the capacitor discharge and which is shorter than a cycle of the self-excited oscillation,
to prevent the voltage of the electrode gap from exceeding the voltage value of the power supply.

2. The electric discharge machining apparatus according to claim 1, further comprising a detector that detects an electrode-gap state in the self-excited oscillation during an ON operation of plurality of switching elements, wherein
the controller controls the on-pulse time based on the detected electrode-gap state.

3. The electric discharge machining apparatus according to claim 2, wherein the controller includes:
a calculator that calculates energy during electric discharge according to the detected electrode-gap state; and
a determiner that determines the on-pulse time and the pause time based on the calculated energy.

4. The electric discharge machining apparatus according to claim 1, further comprising a detector that detects an electrode-gap state in the self-excited oscillation during an ON operation of plurality of switching elements, wherein
the controller controls the pause time based on the detected electrode-gap state.

5. The electric discharge machining apparatus according to claim 2, wherein the controller inserts a pause time into the on-pulse time in response to the controller determining based on the detected electrode-gap state that a short circuit of the electrode gap has occurred.

6. The electric discharge machining apparatus according to claim 4, wherein the controller includes:
a calculator that calculates energy during electric discharge according to the detected electrode-gap state; and
a determiner that determines the on-pulse time and the pause time based on the calculated energy.

7. The electric discharge machining apparatus according to claim 1, wherein the circuit constant of the LCR circuit is determined such that a frequency of the self-excited oscillation is higher than a threshold oscillation control frequency of the controller.

* * * * *